United States Patent [19]

Nohira et al.

[11] 4,230,073
[45] Oct. 28, 1980

[54] COMBUSTION CHAMBER OF AN INTERNAL COMBUSTION ENGINE

[75] Inventors: Hidetaka Nohira, Mishima; Sumio Ito, Susono; Hisashi Oki, Numazu; Teruo Kumai, Susono, all of Japan

[73] Assignee: Toyota Jidosha Kogyo Kabushiki Kaisha, Toyota, Japan

[21] Appl. No.: 50,058

[22] Filed: Jun. 19, 1979

[30] Foreign Application Priority Data

Oct. 19, 1978 [JP] Japan .................................. 53-127886

[51] Int. Cl.² ............................................. F02B 41/00
[52] U.S. Cl. .................................... 123/308; 123/343; 123/307
[58] Field of Search ...................... 123/26, 30 R, 30 C, 123/32 E, 33 B, 33 VC, 75 E, 105, 124 R

[56] References Cited

U.S. PATENT DOCUMENTS

| | | | |
|---|---|---|---|
| 1,424,965 | 8/1922 | Wells | 123/75 E |
| 2,312,500 | 3/1943 | Smith | 123/75 E |
| 3,919,986 | 11/1975 | Goto | 123/75 E |
| 4,103,648 | 8/1978 | Jarry | 123/32 E X |
| 4,117,808 | 10/1978 | Takamiya | 123/75 B |
| 4,167,161 | 9/1979 | Nakagami | 123/124 R X |

*Primary Examiner*—Tony M. Argenbright
*Attorney, Agent, or Firm*—Kenyon & Kenyon

[57] ABSTRACT

An internal combustion engine comprising a combustion chamber and an accumulation chamber which are interconnected to each other via a mixture passage. An accumulation valve is arranged in the mixture passage and opened during the compression stroke. The mixture passage is connected to the combustion chamber at an opening formed on the peripheral inner wall of the cylinder head. The opening of the mixture passage is covered by the rear face of the raised portion formed on the top face to the piston when the piston reaches the top dead center.

9 Claims, 6 Drawing Figures

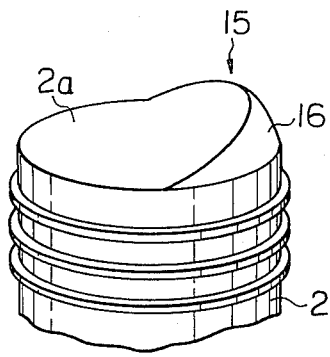
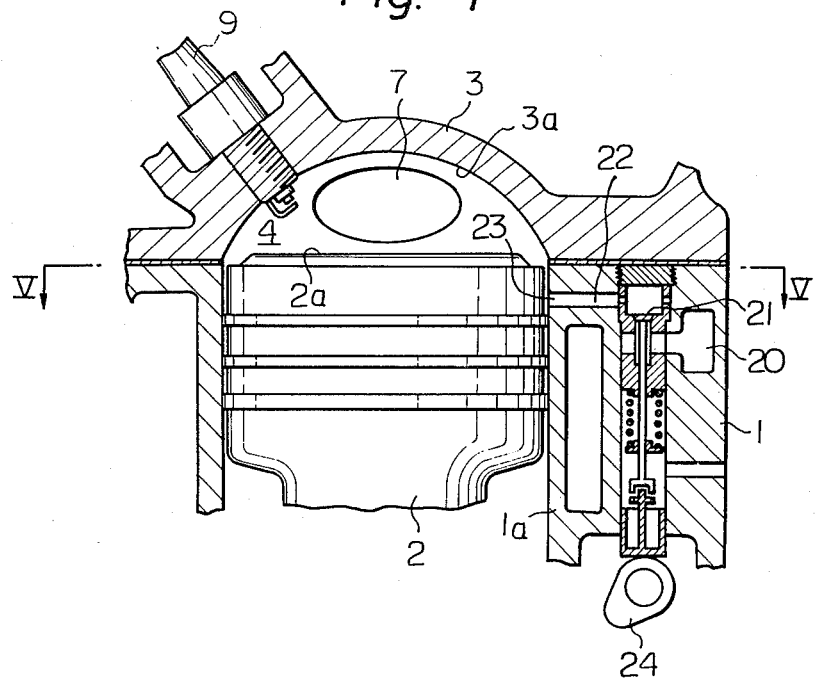

COMBUSTION CHAMBER OF AN INTERNAL COMBUSTION ENGINE

DESCRIPTION OF THE INVENTION

The present invention relates to an internal combustion engine.

At present, in the field of internal combustion engines, an important problem is to improve the thermal efficiency while reducing the amount of harmful components in exhaust gas. As a method of effectively reducing the amount of harmful components in exhaust gas, there has been known a method of simultaneously reducing the amount of harmful HC, CO and $NO_x$ components in the exhaust gas by using a lean air-fuel mixture, and there has also been known a method of reducing the amount of harmful $NO_x$ components in the exhaust gas by recirculating the exhaust gas into the intake system of an engine. However, in either case wherein a lean air-fuel mixture or a mixture containing the recirculated exhaust gas therein is used, there occurs a common problem in that, since the flame speed of such a mixture is very low and, thus, the burning velocity is low, a high termal efficiency cannot be obtained and, as a result, a satisfactory high output of an engine cannot be obtained. Consequently, in the case wherein a lean air-fuel mixture or a mixture containing the recirculated exhaust gas there in is used, in order to improve a thermal efficiency, the most important problem is to increase the flame speed.

With regard to an engine capable of increasing the burning velocity of the combustible mixture in the combustion chamber, the present applicant has already proposed an engine equipped with an accumulation chamber which is connected to the combustion chamber via an accumulation valve, so that a part of the suction gas introduced into the combustion chamber from the intake system of the engine is temporarily accumulated in the accumulation chamber. In this engine, the accumulation valve is opened from the beginning of the compression stroke to the end thereof, so that the suction gas accumulated under high pressure in the accumulation chamber is spouted from the accumulation chamber into the combustion chamber in the first half of the compression stroke. The suction gas thus spouted causes a strong swirl motion in the combustion chamber and, as a result, the burning velocity is increased.

In order to create a much stronger swirl motion in the combustion chamber in the above-mentioned engine, it is necessary to increase the pressure of the mixture accumulated in the accumulation chamber. To this end, it is necessary to retard the closing time of the accumulation valve as much as possible. However, in the case wherein the closing time of the accumulation valve is retarded, the flame of the mixture ignited by the spark plug in the combustion chamber propagates into the accumulation chamber and, thus, the mixture accumulated in the accumulation chamber is ignited by the flame. Nevertheless, in this case, since the accumulation valve is closed immediately after the mixture in the accumulation chamber is ignited, the mixture in the accumulation chamber is merely burned and, thus, the combustion of the mixture in the accumulation chamber does not contribute to the movement of the piston 2. This results in a problem in that the output power of the engine is reduced. Consequently, in the above-mentioned engine, in order to prevent the flame in the combustion chamber from propagating into the accumulation chamber, the closing time of the accumulation valve is set at a time near a time at which the ignition is carried out.

An object of the present invention is to provide an internal combustion engine provided with an accumulation chamber, which is capable of retarding the closing time of the accumulation valve while preventing the flame in the combustion chamber from propagating into the accumulation chamber.

According to the present invention, there is provided an internal combustion engine comprising: a cylinder block having an inner wall defining a cylinder bore; a cylinder head having an inner wall therein and mounted on said cylinder block; a piston reciprocally movable in said cylinder bore and having a top face and an upper circumferential wall which is aproachable to at least one of a peripheral portion of the inner wall of said cylinder head and an upper portion of the inner wall of said cylinder bore when said piston reaches the top dead center; a combustion chamber formed between the inner wall of said cylinder head and the top face of said piston; an intake valve movably mounted on said cylinder head for leading a suction gas into said combustion chamber; and exhaust valve movably mounted on said cylinder head for discharging an exhaust gas into the atmosphere; an accumulation chamber in said inner wall; a gas passage communicating said accumulation chamber with said combustion chamber and having an opening which is formed on at least one of the peripheral portion of the inner wall of said cylinder head and the upper portion of the inner wall of said cylinder bore so that said opening is covered by the upper circumferential wall of said piston when said piston reaches the Top dead center, and; a valve means arranged in said gas passage and opened during the compression stroke.

The present invention may be more fully understood from the following description of preferred embodiments of the invention, together with the accompanying drawings.

BREIF DESCRIPTION OF THE DRAWINGS

In the drawings:

FIG. 3 is a perspective view of the piston illustrated in FIG. 1;

FIG. 4 is a cross-sectional side view of an alternative embodiment according to the present invention;

DESCRIPTION OF PREFERRED EMBODIMENTS

Figure 1:
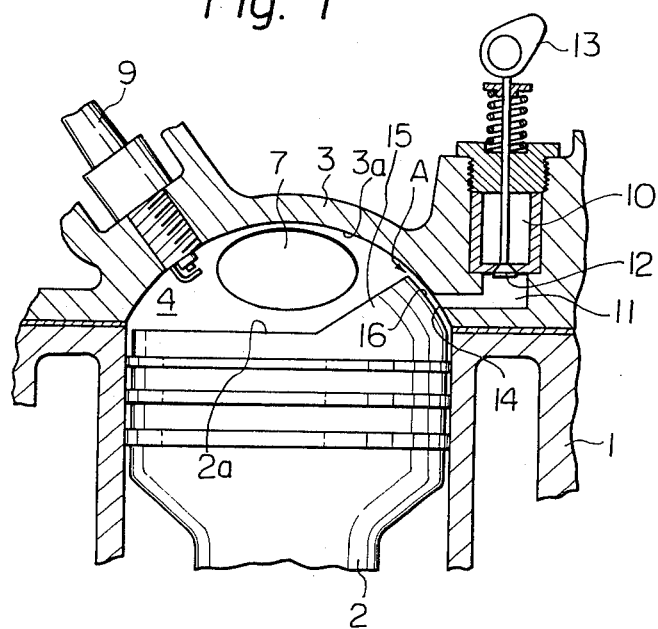
FIG. 1 is a cross-sectional side view of an embodiment of an internal combustion engine according to the present invention.
Figure 2:
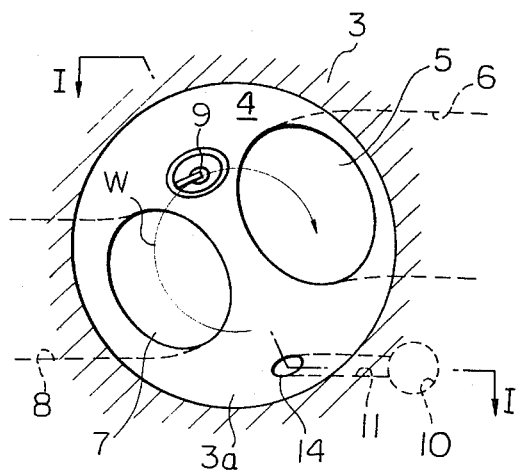
FIG. 2 is a bottom view of the cylinder head shown in FIG. 1.

Referring to FIGS. 1 and 2, 1 designates a cylinder block, 2 a piston reciprocally movable in the cylinder block 1; 3 designates a cylinder head fixed onto the cylinder block 1; 4 designates a combustion chamber formed between the top face 2a of the piston 2 and the semi-spherical inner wall 3a of the cylinder head 3; 5 designates an intake valve, 6 an intake port, 7 an exhaust balve, 8 an exhaust port, and 9 a spark plug. An accumulation chamber 10 and a mixture passage 11 are formed in the cylinder head 3, and an accumulation valve 12 is arranged at the bottom end of the accumulation chamber 10. As is illustrated in FIG. 1, the accumulation valve 12 is actuated by a cam 13 which is driven by the engine. The mixture passage 11 is connected to the combustion chamber 4 at an opening 14 which is formed on the periphery of the semi-spherical inner wall 3a of the cylinder head 3. Consequently, when the accumulation valve 12 is opened, the accumulation chamber 10 is connected to the combustion chamber 4 via the accumulation valve 12 and the mixture passage 11. As is illustrated in FIG. 1, a raised portion 15 is formed in one piece on the top face 2a of the piston 2 so that, when the piston 2 is positioned at the top dead center as illustrated in FIG. 1, the spherical rear face 16 of the raised portion 15 covers the opening 14 of the mixture passage 11 and, at the same time, a squish area A is formed between the rear face 16 of the raised portion 15 and the inner wall 3a of the cylinder head 3.

Figure 6:
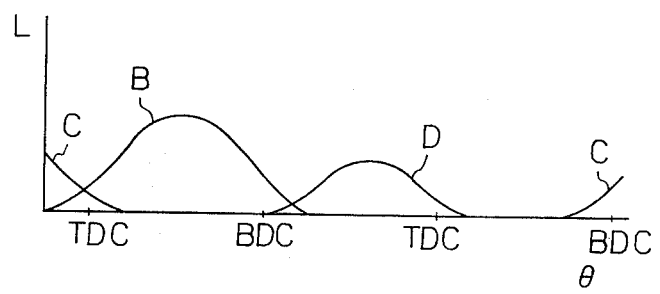
FIG. 6 is a graph showing the opening time of the intake valve, the exhaust valve and the accumulation valve.

Referring to FIG. 6, the curved lines B, C and D indicate the opening time of the intake valve 5, the exhaust valve 7 and the accumulation valve 12, respectively. In FIG. 6, the ordinate L indicates valve lift and the abscissa $\theta$ indicates crank angle. From FIG. 6, it will be understood that the accumulation valve 12 is opened at a crank angle near the bottom dead center at the beginning of the compression stroke and closed at a crank angle near the top dead center at the beginning of the power stroke.

In operation, at the time of the intake stroke, a lean air-fuel mixture or a mixture containing a large amount of the recirculated exhaust gas therein is introduced into the combustion chamber 4 via the intake valve 5. After this, when the piston 2 moves downwards to the bottom dead center and then begins to move upwards, the accumulation valve 12 is opened immediately before the intake valve 5 is closed. As is hereinafter described, a combustible mixture under high pressure, which is introduced into the accumulation chamber 10 at the compression stroke in the preceding cycle, is accumulated in the accumulation chamber 10 and, on the other hand, the pressure in the combustion chamber 4 is lower than the atmospheric pressure at the start of the compression stroke. Consequently, the pressure difference between the pressure in the combustion chamber 4 and the accumulation chamber 10 is large and, thus, when the accumulation valve 12 is opened, the combustible mixture accumulated in the accumulation chamber 10 is spouted from the opening 14 into the combustion chamber 4 at a high speed. At this time, since the opening 14 is directed tangentially to the circumferential inner wall of the combustion chamber 4 as illustrated in FIG. 2, a strong swirl motion shown by the arrow W in FIG. 2 is created in the combustion chamber 4. Then, if the piston 2 further moves upwards, since the pressure in the accumulation chamber 10 is maintained higher than that in the combustion chamber 4 for a while, the combustible mixture in the accumulation chamber 10 continues to be spouted into the combustion chamber 4. As a result of this, the swirl motion created in the combustion chamber 4 is further strengthened. When the piston 2 further moves upwards and the pressure in the accumulation chamber 10 becomes equal to that in the combustion chamber 4, the spouting operation of the combustible mixture in the accumulation chamber 10 is stopped. After this, when the piston 2 further moves upwards, since the pressure in the combustion chamber 4 becomes higher than that in the accumulation chamber 10, the combustible mixture in the combustion chamber 4 flows into the accumulation chamber 10. As the piston 2 further moves upwards, the pressure in the combustion chamber 4 is increased and, accordingly, the pressure in the accumulation chamber 10 is also increased. After this, when the piston 2 approaches the top dead center, the mixture in the combustion chamber 4 is ignited. As a result, the flame of the mixture thus ignited spreads within the combustion chamber 4 and the pressure in the combustion chamber 4 is increased. At this time, since the piston 2 has reached a position near the top dead center, the flame spreading towards the opening 14 is extinguished within the squish area A. However, at this time, since the pressure in the combination chamber 4 propagates into the accumulation chamber 10 via the mixture passage 11, the pressure in the accumulation chamber 10 is considerably increased. After this, when the accumulation valve 12 is closed, the unburned mixture under high pressure is accumulated in the accumulation chamber 10. This combustible mixture under high pressure is spouted into the combustion chamber 4 at the next cycle to create a strong swirl motion in the combustion chamber 4. In addition, in the embodiment illustrated in FIG. 1, since a squish flow is spouted from the squish area A into the combustion chamber 4 at the end of the compression stroke, a turbulence is further added to the swirling mixture in the combustion chamber 4 and, as a result, the burning velocity is considerably increased.

Figure 5:
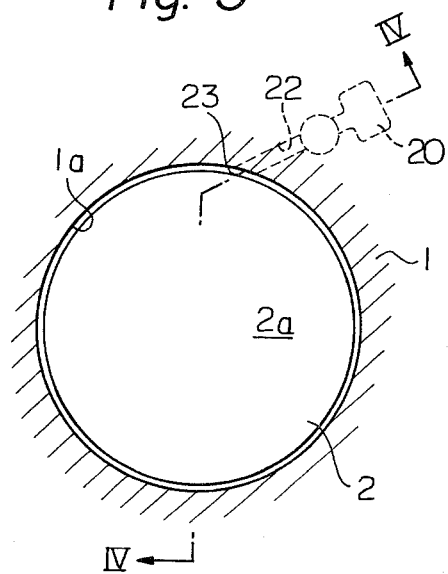
FIG. 5 is a cross-sectional plan view taken along the line V—V in FIG. 4.

FIGS. 4 and 5 illustrate a alternative embodiment according to the present invention. In this embodiment, an accumulation chamber 20 is formed in the cylinder block 1 and connected to the combustion chamber 4 via an accumulation valve 21 and a mixture passage 22. As is illustrated in FIG. 4, the mixture passage 22 is connected to the combustion chamber 4 at an opening 23 which is formed on the inner wall of the cylinder bore 1a of the cylinder block 1. The opening 23 of the mixture passage 22 is directed tangentially to the inner wall of the cylinder bore 1a as illustrated in FIG. 5. The accumulation valve 21 is opened by a cam 24 which is driven by the engine as illustrated by the curved line D in FIG. 6. Consequently, in this embodiment, in the same manner as described with reference to FIG. 1, the mixture under high pressure accumulated in the accumulation chamber 20 is spouted from the opening 23 in the first half of the compression stroke and, as a result, a strong swirl motion is created in the combustion chamber 4. On the other hand, since the opening 23 is covered by the circumferential wall of the piston 2 when the piston 2 approaches the top dead center, the flame created in the combustion chamber 4 cannot propagate into the accumulation chamber 20. However, since the pressure in the combustion chamber 4 propagates into the accumulation chamber 20, the unburned mixture under high pressure is accumulated in the accumulation chamber 20.

According to the present invention, since it is possible to retard the closing time of the accumulation valve while preventing the flame in the combustion chamber from propagating into the accumulation chamber, the unburned mixture under high pressure can be accumulated in the accumulation chamber. As a result of this, since the velocity of the mixture spouted from the accumulation chamber in the first half of the compression stroke is increased, a considerably strong swirl motion can be created in the combustion chamber. Consequently, if a lean air-fuel mixture or a mixture containing recirculated exhaust gas therein is used, the burning velocity can be increased and, thus, a stable combustion can be ensured even if the engine is operating under a light load.

While the invention has been described by reference to specific embodiments choses for purposes of illustration, it should be apparent that numerous modifications could be made thereto by those skilled in the art without departing from the spirit and scope of the invention.

What is claimed is:

1. An internal combustion engine comprising:
   a cylinder block having therein an inner wall defining a cylinder bore;
   a cylinder head having an inner wall therein and mounted on said cylinder block;
   a piston reciprocally movable in said cylinder bore and having a top face and an upper circumferential wall which is approachable to at least one of a peripheral portion of the inner wall of said cylinder head and an upper portion of the inner wall of said cylinder bore when said piston reaches the top dead center;
   a combustion chamber formed between the inner wall of said cylinder head and the top face of said piston;
   an intake valve movably mounted on said cylinder head for leading a suction gas into said combustion chamber;
   an exhaust valve movably mounted on said cylinder head for discharging an exhaust gas into the atmosphere;
   an accumulation chamber formed in said inner wall;
   a gas passage communicating said accumulation chamber with said combustion chamber and having an opening which is formed on at least one of the peripheral portion of the inner wall of said cylinder head and the upper portion of the inner wall of said cylinder bore so that said opening is covered by the upper circumferential wall of said piston when said piston reaches the top dead center, and;
   a valve means arranged in said gas passage and opened during the compression stroke.

2. An internal combustion engine as claimed in claim 1, wherein said valve means is opened immediately before said intake valve is closed.

3. An internal combustion engine as claimed in claim 1, wherein said valve means is closed at the beginning of the power stroke.

4. An internal combustion engine as claimed in claim 1, wherein said valve means comprises a poppet valve driven by said engine.

5. An internal combustion engine as claimed in claim 1, wherein the opening of said gas passage is formed on the peripheral portion of the inner wall of said cylinder head, said piston forming a raised portion on the top face thereof, said upper circumferential wall being formed on said raised portion.

6. An internal combustion engine as claimed in claim 5, wherein the upper circumferential wall of said piston and the peripheral portion of the inner wall of said cylinder head form a squish area therebetween when said piston reaches the top dead center.

7. An internal combustion engine as claimed in claim 5, wherein the opening of said gas passage is directed tangentially to a circumferential inner wall of said cylinder head.

8. An internal combustion engine as claimed in claim 1, wherein the opening of said gas passage is formed on the upper portion of the inner wall of said cylinder bore, said piston having a flat top face.

9. An internal combustion engine as claimed in claim 8, wherein the opening of said gas passage is directed tangentially to the inner wall of said cylinder bore.

* * * * *

UNITED STATES PATENT AND TRADEMARK OFFICE
CERTIFICATE OF CORRECTION

PATENT NO. : 4,230,073
DATED : October 28, 1980
INVENTOR(S) : Hidetaka Nohira, et al.

It is certified that error appears in the above—identified patent and that said Letters Patent is hereby corrected as shown below:

Column 4, line 15, "combination" should read -- combustion --.
Column 4, line 31, "a" should read -- an --.
Column 5, line 7, "choses" should read -- chosen --.

Signed and Sealed this

Twenty-first Day of July 1981

[SEAL]

Attest:

GERALD J. MOSSINGHOFF

Attesting Officer       Commissioner of Patents and Trademarks